(12) United States Patent
Li et al.

(10) Patent No.: US 10,416,371 B2
(45) Date of Patent: Sep. 17, 2019

(54) BACKLIGHT SYSTEM OF LIQUID CRYSTAL DISPLAY DEVICE

(71) Applicant: WUHAN CHINA STAR OPTOELECTRONICS TECHNOLOGY CO., LTD., Wuhan, Hubei (CN)

(72) Inventors: Xueyun Li, Hubei (CN); Yuejun Tang, Hubei (CN); Jing Cai, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 183 days.

(21) Appl. No.: 15/549,945

(22) PCT Filed: Jun. 7, 2017

(86) PCT No.: PCT/CN2017/087369
§ 371 (c)(1),
(2) Date: Aug. 9, 2017

(87) PCT Pub. No.: WO2018/209737
PCT Pub. Date: Nov. 22, 2018

(65) Prior Publication Data
US 2019/0107659 A1 Apr. 11, 2019

(30) Foreign Application Priority Data
May 16, 2017 (CN) .......................... 2017 1 0342140

(51) Int. Cl.
*F21V 8/00* (2006.01)
*G02F 1/1333* (2006.01)
(Continued)

(52) U.S. Cl.
CPC ........... *G02B 6/005* (2013.01); *G02B 6/0065* (2013.01); *G02B 6/0088* (2013.01);
(Continued)

(58) Field of Classification Search
CPC ..... G02B 6/005; G02B 6/0065; G02B 6/0088
See application file for complete search history.

(56) References Cited

U.S. PATENT DOCUMENTS 7,374,350 B2  5/2008  Kadomi et al.
2014/0198528 A1  7/2014  Chae
(Continued)

FOREIGN PATENT DOCUMENTS

CN  205015588 U  2/2010
CN  104344328 A  2/2015
(Continued)

*Primary Examiner* — Alexander K Garlen

(57) ABSTRACT

Disclosed is a backlight system of a liquid crystal display device. A light guide plate is provided on a frame. A quantum dot diaphragm is arranged above or below the light guide plate. An optical diaphragm set is arranged above the light guide plate or the quantum dot diaphragm. When the quantum dot diaphragm is cut, left and right sides or/and upper and lower sides thereof are left with margins which are processed into bending portions while the backlight system is manufactured. Useless areas are located on the margins. The margins are bent, and are configured to encase the light guide plate or the optical diaphragm set.

5 Claims, 3 Drawing Sheets

(51) Int. Cl.
*G02B 6/02* (2006.01)
*G02F 1/1335* (2006.01)

(52) U.S. Cl.
CPC ..... *G02B 6/0229* (2013.01); *G02F 1/133308* (2013.01); *G02F 1/133615* (2013.01)

(56) References Cited

U.S. PATENT DOCUMENTS

| | | |
|---|---|---|
| 2016/0097892 A1* | 4/2016 | Jeon .................... G02B 6/0031 349/62 |
| 2016/0107659 A1 | 4/2016 | Andrew et al. |
| 2016/0116663 A1 | 4/2016 | Hong et al. |
| 2017/0153384 A1* | 6/2017 | Zeng ..................... G02B 6/005 |
| 2018/0045881 A1* | 2/2018 | Gotou ....................... F21S 2/00 |
| 2018/0081105 A1* | 3/2018 | Harada .................... F21V 9/40 |

FOREIGN PATENT DOCUMENTS

| | | |
|---|---|---|
| CN | 104777670 A | 7/2015 |
| CN | 104864318 A | 8/2015 |
| CN | 105549267 A | 5/2016 |
| CN | 105588040 A | 5/2016 |
| JP | 2017021297 A | 1/2017 |

\* cited by examiner

BACKLIGHT SYSTEM OF LIQUID CRYSTAL DISPLAY DEVICE

CROSS-REFERENCE TO RELATED APPLICATIONS

This application claims the priority of Chinese patent application CN 201710342140.0, entitled "Backlight System of Liquid Crystal Display Device" and filed on May 16, 2017, the entirety of which is incorporated herein by reference.

FIELD OF THE INVENTION

The present disclosure relates to the technical field of display, and in particular, to a backlight system of a liquid crystal display device.

BACKGROUND OF THE INVENTION

With the development of electronic products, consumers have a higher and higher requirement for color gamut, and therefore the high color gamut design has become an important direction for the design of electronic products. In the high color gamut product design, the current mainstream approach to achieve high color gamut conversion is by using a quantum dot diaphragm. This kind of diaphragm can achieve high-efficiency color gamut conversion. However, cutting of the diaphragm usually renders an area of about 1 mm of the cutting area useless. For mobile products with narrow frames, a useless area resulted from the cutting may cause the quantum dot diaphragm not to be better applied to the products. In view of the above problems, it is desirable in the art to get rid of the defect that a useless area can be resulted from cutting of the diaphragm, so that the diaphragm can achieve better color gamut conversion so as to solve problems in the prior art.

SUMMARY OF THE INVENTION

In view of the above problems, the present disclosure provides a modified backlight system of a liquid crystal display device.

In order to achieve the above object, the present disclosure provides a backlight system of a liquid crystal display device. The backlight system comprises a frame, a quantum dot diaphragm, a light guide plate, and an optical diaphragm set. The frame is provided thereon with the light guide plate which is used for converting a side light source into a surface light source. When the quantum dot diaphragm is arranged above the light guide plate, the optical diaphragm set is arranged above the quantum dot diaphragm, or when the quantum dot diaphragm is arranged below the light guide plate, the optical diaphragm set is arranged above the light guide plate.

The quantum dot diaphragm is configured to have bending portions on left and right sides and/or upper and lower sides thereof.

A gap is left between an edge of the frame and an edge of the light guide plate.

When the quantum dot diaphragm is arranged above the light guide plate, the bending portions on the left and right sides or the upper and lower sides of the quantum dot diaphragm are inserted downward into the gap to encase both sides of the light guide plate, or the bending portions on the left and right sides and the upper and lower sides of the quantum dot diaphragm are inserted downward into the gap to encase four sides of the light guide plate.

When the quantum dot diaphragm is arranged above the light guide plate, the bending portions on the left and right sides or the upper and lower sides of the quantum dot diaphragm bend upward to encase both sides of the optical diaphragm set, or the bending portions on the left and right sides and the upper and lower sides of the quantum dot diaphragm encase four sides of the optical diaphragm set.

When the quantum dot diaphragm is arranged below the light guide plate, the bending portions on the left and right sides or the upper and lower sides of the quantum dot diaphragm are inserted upward into the gap to are encase both sides of the light guide plate, or the bending portions on the left and right sides and the upper and lower sides of the quantum dot diaphragm are inserted upward into the gap to encase four sides of the light guide plate.

The quantum dot diaphragm is formed by sandwiching a plurality of quantum dots uniformly between an upper PET film and a lower PET (Polyethylene Glycol Terephthalate) film, or formed by mixing a plurality of the quantum dots uniformly with a PI flexible polymer or complex fluid and drying a mixture thereof, or formed by mixing a plurality of the quantum dots with a transparent resin solvent and coating a mixture thereof onto a PI (Polyimide) flexible base layer.

A length and/or width of the quantum dot diaphragm are/is larger than a length and/or width of the light guide plate.

A length and/or width of the quantum dot diaphragm are/is larger than a length and/or width of the optical diaphragm set.

In the above mentioned technical solutions, compared with the prior art, according to the backlight system of a liquid crystal display device provided by the present disclosure, a frame is provided thereon with a light guide plate; a quantum dot diaphragm is arranged above or below the light guide plate; and an optical diaphragm set is arranged above the light guide plate or the quantum dot diaphragm. When the quantum dot diaphragm is cut, left and right sides thereof are left with margins, which are processed into bending portions while the backlight system is manufactured, or left and right sides and upper and lower sides thereof are left with margins, which are processed into bending portions while the backlight system is manufactured. Useless areas are located on the margins. The margins are bent first, and are configured to encase the light guide plate or the optical diaphragm set, so that an entire display panel has a quantum dot diaphragm which can achieve high-efficiency color gamut conversion while displaying an image. Thus, an impact on image quality caused by useless areas resulted from cutting of the quantum dot diaphragm can be avoided. Moreover, the backlight system is simple in structure, and is easy to manufacture.

All the above mentioned technical features may be combined together in any manner, or substituted by equivalent technical features, as long as the objective of the present disclosure can be realized.

BRIEF DESCRIPTION OF THE DRAWINGS

The present disclosure will be described in a more detailed way below based on embodiments and with reference to the accompanying drawings, in which.

DETAILED DESCRIPTION OF THE EMBODIMENTS

Figure 4:
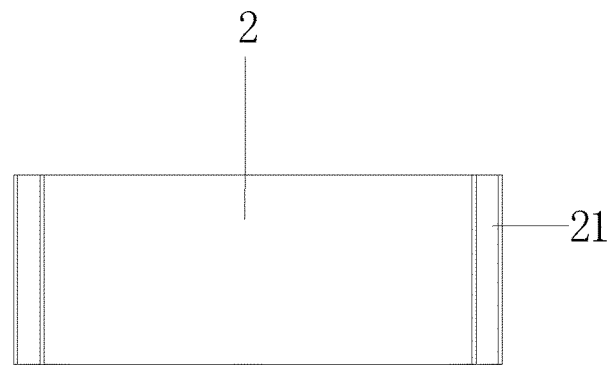
FIG. 4 schematically shows a quantum dot diaphragm which is provided with bending portions on the left and right sides thereof according to one embodiment of the present disclosure.
Figure 5:
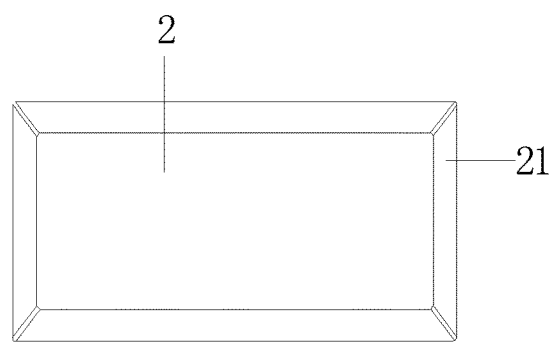
FIG. 5 schematically shows a quantum dot diaphragm which is provided with bending portions on the left and right sides and the upper and lower sides thereof according to one embodiment of the present disclosure.

The present disclosure will be further explained below with reference to the accompanying drawings FIGS. 1 to 3 each schematically show a backlight system of a liquid crystal display device with a quantum dot diaphragm. The backlight system comprises a frame 4, a quantum dot diaphragm 2, a light guide plate 3, and an optical diaphragm set 1. The frame 4 is provided thereon with the light guide plate 3 which is used for converting a side light source into a surface light source. The optical diaphragm set 1 includes, but is not limited to a prism sheet, or a diffusion sheet. When the quantum dot diaphragm 2 is arranged above the light guide plate 3, the optical diaphragm set 1 is arranged above the quantum dot diaphragm 2, or when the quantum dot diaphragm 2 is arranged below the light guide plate 3, the optical diaphragm set 1 is arranged above the light guide plate 3. As shown in FIG. 4, in one embodiment, the quantum dot diaphragm 2 is configured to have bending portions 21 on left and right sides thereof or on upper and lower sides thereof. As shown in FIG. 5, in one embodiment, the quantum dot diaphragm 2 is configured to have bending portions 21 on the left and right sides thereof and on the upper and lower sides thereof.

The backlight system with the quantum dot diaphragm provided by the present disclosure enables an entire display panel to have a high-efficiency color gamut conversion when displaying an image, and helps to avoid an impact on image quality caused by a useless area resulted from cutting of the quantum dot diaphragm. Moreover, the backlight system is simple in structure, and is easy to manufacture.

Figure 1:
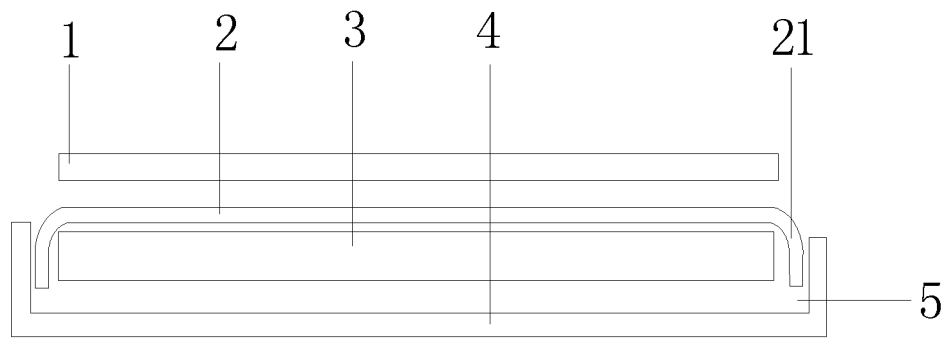
FIG. 1 schematically shows a structure in which bending portions on both sides of a quantum dot diaphragm are located in a gap and are configured to encase both sides of a light guide plate when the quantum dot diaphragm is arranged above the light guide plate in a backlight system of a liquid crystal display device according to one embodiment of the present disclosure.

FIG. 1 describes the backlight system of a liquid crystal display device with the quantum dot diaphragm (some existing components are not shown). The backlight system is arranged behind the liquid crystal display device to provide a backlight for the display device. The quantum dot diaphragm 2 is usually provided above the light guide plate 3. However, cutting of the quantum dot diaphragm 2 usually results in a useless area of about 1 mm of the cutting area, leading to optical deterioration such as color difference and failure in developing of color saturation on margins of the quantum dot diaphragm.

Figure 2:
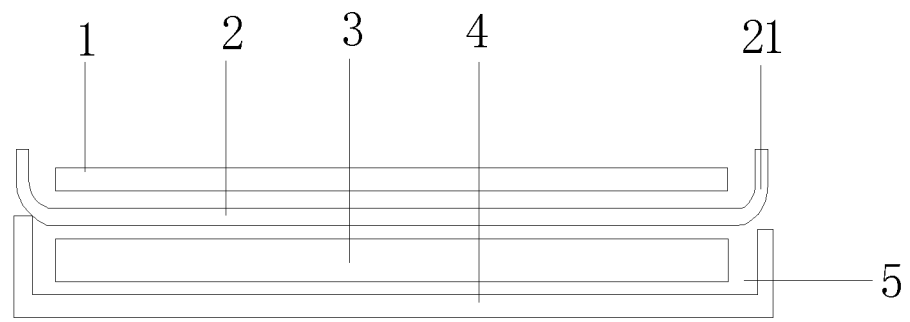
FIG. 2 schematically shows a structure in which bending portions on both sides of a quantum dot diaphragm are configured to encase both sides of an optical diaphragm set when the quantum dot diaphragm is arranged above a light guide plate in a backlight system of a liquid crystal display device according to one embodiment of the present disclosure.
Figure 3:
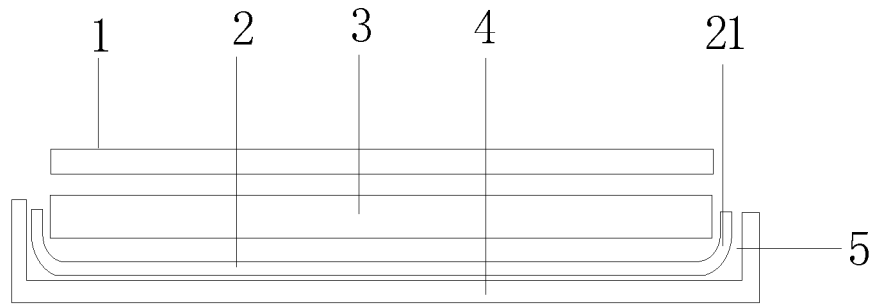
FIG. 3 schematically shows a structure in which bending portions on both sides of a quantum dot diaphragm are configured to encase both sides of a light guide plate when the quantum dot diaphragm is arranged below the light guide plate in a backlight system of a liquid crystal display device according to one embodiment of the present disclosure.

In one preferable embodiment, as shown in FIGS. 1 to 3, a gap 5 is left between an edge of the frame 4 and an edge of the light guide plate 3. The gap 5 is configured to have a width that enables the bending portions 21 to be inserted therein. If the width of the gap 5 is too large, the bending portions 21 may wobble, while if the width of the gap 5 is too small, the bending portions 21 may not be inserted.

In one embodiment, as shown in FIG. 1, when the quantum dot diaphragm 2 is arranged above the light guide plate 3, the bending portions 21 on the left and right sides or on the upper and lower sides of the quantum dot diaphragm 2 are inserted downward into the gap 5 to encase both sides of the light guide plate. In one embodiment, the bending portions 21 on the left and right sides and on the upper and lower sides of the quantum dot diaphragm 2 are inserted downward into the gap 5 to encase four sides of the light guide plate 3. In one embodiment, as shown in FIG. 2, when the quantum dot diaphragm 2 is arranged above the light guide plate 3, the bending portions 21 on the left and right sides or on the upper and lower sides of the quantum dot diaphragm 2 are bent upward to encase both sides of the optical diaphragm set 1. In one embodiment, the bending portions 21 on the left and right sides and on the upper and lower sides of the quantum dot diaphragm 2 are configured to encase four sides of the optical diaphragm set 1. In a manufacturing process according to some embodiments, margins are left on the left and right sides or on the upper and lower sides of the quantum dot diaphragm 2, the useless areas are located on the margins, and the margins on the left and right sides or the upper and lower sides of the quantum dot diaphragm are configured to be the bending portions 21 while the backlight system is manufactured. In a manufacturing process according to some embodiments, margins are left on the left and right sides and on the upper and lower sides at the same time, the useless areas are located on the margins, and the margins on the left and right sides and on the upper and lower sides of the quantum dot diaphragm are configured to be the bending portions 21 while the backlight system is manufactured. The useless areas are located on the margins. The margins in the backlight system are bent first, and then are configured to encase the light guide plate 3 or the optical diaphragm set 1, so that the entire display panel has the quantum dot diaphragm that can achieve high-efficiency color gamut conversion while the display panel displays an image. Thus, an impact on image quality caused by the useless areas resulted from the cutting of the quantum dot diaphragm 2 can be avoided. Moreover, the backlight system is simple in structure, and is easy to manufacture.

In one embodiment, as shown in FIG. 3, when the quantum dot diaphragm 2 is arranged below the light guide plate 3, the bending portions 21 on the left and right sides or on the upper and lower sides of the quantum dot diaphragm 2 are inserted upward into the gap 5 to encase both sides of the light guide plate. In one embodiment, the bending portions 21 on the left and right sides and on the upper and lower sides of the quantum dot diaphragm 2 are inserted upward into the gap 5 to encase four sides of the light guide plate 3. In a manufacturing process according to some embodiments, margins are left on the left and right sides or on the upper and lower sides of the quantum dot diaphragm 2, the useless areas are located on the margins, and the margins on the left and right sides or on the upper and lower sides of the quantum dot diaphragm are configured to be the bending portions 21 while the backlight system is manufactured. In a manufacturing process according to some embodiments, margins are left on the left and right sides and on the upper and lower sides at the same time, the useless areas are located on the margins, and the margins on the left and right sides and on the upper and lower sides of the quantum dot diaphragm are configured to be the bending portions 21 while the backlight system is manufactured. The useless areas are located on the margins. The margins in the backlight system are bent first, and then are configured to encase the light guide plate 3 or the optical diaphragm set 1, so that the entire display panel has the quantum dot diaphragm which can achieve high-efficiency color gamut conversion while the display panel displays an image. Thus, an impact on image quality caused by the useless areas resulted from the cutting of the quantum dot diaphragm 2 can be avoided. Moreover, the backlight system is simple in structure, and is easy to manufacture.

Figure 6:
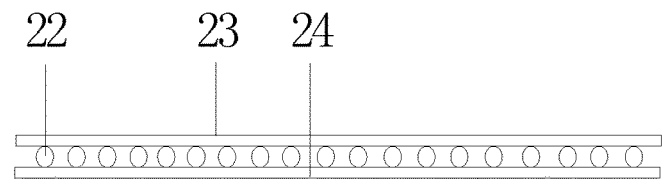
FIG. 6 schematically shows formation of the quantum dot diaphragm in the backlight system of the liquid crystal display device according to one embodiment of the present disclosure.
Figure 7:
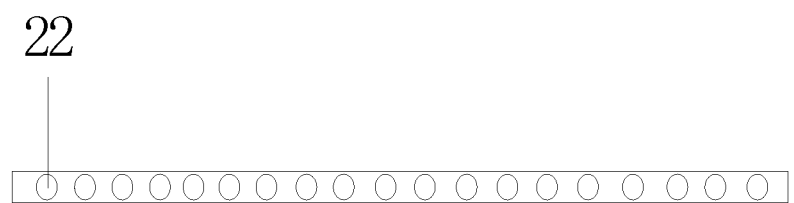
FIG. 7 schematically shows formation of the quantum dot diaphragm in the backlight system of the liquid crystal display device according to another embodiment of the present disclosure.
Figure 8:
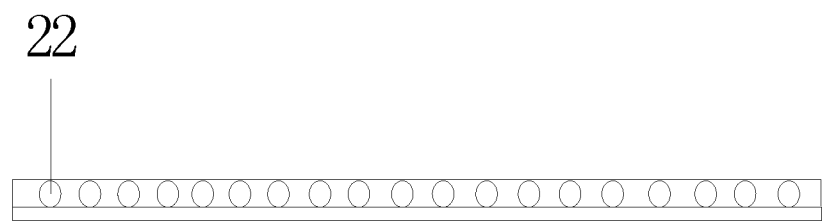
FIG. 8 schematically shows formation of the quantum dot diaphragm in the backlight system of the liquid crystal display device according to further another embodiment of the present disclosure.

In one embodiment, as shown in FIGS. 6 to 8, the quantum dot diaphragm 2 may be formed in the following three ways.

As shown in FIG. 6, the quantum dot diaphragm 2 may be formed by sandwiching a plurality of quantum dots 22 uniformly between an upper PET (Polyethylene Glycol Terephthalate) film 23 and a lower PET film 24.

As shown in FIG. 7, the quantum dot diaphragm 2 may be formed by mixing a plurality of the quantum dots 22 uniformly with a PI (polyimide) flexible polymer or a complex fluid and drying a mixture thereof.

As shown in FIG. 8, the quantum dot diaphragm 2 may be formed by mixing a plurality of the quantum dots 22 with a transparent resin solvent, and coating a mixture thereof onto a PI flexible base layer.

Further, a length and/or width of the quantum dot diaphragm 2 are/is larger than a length and/or width of the light guide plate 3.

Further, a length and/or width of the quantum dot diaphragm 2 are/is larger than a length and/or width of the optical diaphragm set 1.

In specific use, the backlight system is formed as follows.

First, margins are left when the quantum dot diaphragm 2 is cut. The useless areas are located on the margins. The margins in the backlight system are bent, and are configured to encase the light guide plate 3 or the optical diaphragm set 1, so that the entire display panel has the quantum dot diaphragm 2 which can achieve high-efficiency color gamut conversion while the display panel displays an image. The margins of the quantum dot diaphragm 2 may be arranged on an upper surface of the light guide plate 3 to encase the light guide plate 3 or the optical diaphragm set 1. The margins of the quantum dot diaphragm 2 may also be arranged below the light guide plate 3 to encase the light guide plate 3.

The margins of the quantum dot diaphragm 2 may be configured to encase backlight components from both sides or four sides.

The quantum dot diaphragm may be formed by sandwiching quantum dots 22 between two PET films. The quantum dots 22 are fixed between the two PET films by an adhesive layer.

The quantum dot diaphragm may be formed by mixing quantum dots 22 uniformly with a flexible polymer fluid of, for example PI, and then drying or hardening a mixture thereof.

The quantum dot diaphragm may also be formed by mixing quantum dots 22 with a solvent uniformly, and coating a mixture thereof onto a PI flexible base layer. The solvent may be transparent resin (OC) solvent, etc.

The margins of the quantum dot diaphragm 2 may be bent by 90 degrees, but preferably not by 90 degrees. The margins may be bent into an arc. A radius of the arc is strongly correlated with a thickness of the quantum dot diaphragm 2. The smaller the thickness of the quantum dot diaphragm 2 is, the smaller the radius R of the arc may be.

The quantum dot diaphragm 2 may be configured to have a small thickness so that it can be easily bent.

The quantum dot diaphragm 2 may be bent to side portions of a backlight, and the quantum dot diaphragm 2 may be configured to have an extremely small thickness. The backlight system of the present disclosure is suitable for liquid crystal display devices of various applications and sizes, for example, large-size display devices such as televisions, or middle-size display devices such as notebooks and tablet computers.

While the present disclosure has been described with reference to preferred embodiments, various amendments may be made thereto without departing from the scope of the present disclosure, and equivalents may be substituted for components thereof. In particular, the technical features mentioned in the various embodiments may be combined in any manner as long as there is no structural conflict. The present disclosure is not limited to the specific embodiments disclosed herein, but includes all technical solutions falling within the scope of the claims.

The invention claimed is:

1. A backlight system of a liquid crystal display device, wherein the backlight system comprises: a frame, a quantum dot diaphragm, a light guide plate, and an optical diaphragm set,
   wherein the frame is provided thereon with the light guide plate which is used for converting a side light source into a surface light source; and
   wherein the quantum dot diaphragm is arranged above the light guide plate, and the optical diaphragm set is arranged above the quantum dot diaphragm;
       wherein the quantum dot diaphragm is configured to have bending portions on left and right sides thereof, upper and lower sides thereof, or the left and right sides and the upper and lower sides thereof, and the bending portions are bent upward to encase sides of the optical diaphragm set.

2. The backlight system of the liquid crystal display device according to claim 1, wherein a gap is left between an edge of the frame and an edge of the light guide plate.

3. The backlight system of the liquid crystal display device according to claim 1, wherein, the quantum dot diaphragm is formed by sandwiching a plurality of quantum dots uniformly between an upper PET film and a lower PET film, or formed by mixing a plurality of the quantum dots uniformly with a PI flexible polymer or complex fluid and drying a mixture thereof, or formed by mixing a plurality of the quantum dots with a transparent resin solvent and coating a mixture thereof onto a PI flexible base layer.

4. The backlight system of the liquid crystal display device according to claim 1, wherein a length of the quantum dot diaphragm is larger than a length of the light guide plate, a width of the quantum dot diaphragm is larger than a width of the light guide plate, or the length and width of the quantum dot diaphragm are respectively larger than the length and width of the light guide plate.

5. The backlight system of the liquid crystal display device according to claim 1, wherein a length of the quantum dot diaphragm is larger than a length of the optical diaphragm set, a width of the quantum dot diaphragm is larger than a width of the optical diaphragm set, or the length and width of the quantum dot diaphragm are respectively larger than the length and width of the optical diaphragm set.

* * * * *